United States Patent

[11] 3,599,994

| [72] | Inventor | William L. Komph, Sr.<br>Port Huron, Mich. |
|---|---|---|
| [21] | Appl. No. | 4,559 |
| [22] | Filed | Jan. 21, 1970 |
| [45] | Patented | Aug. 17, 1971 |
| [73] | Assignee | McDowell-Wellman Engineering Company<br>Cleveland, Ohio |

[54] SHAFT SEAL FOR ROTATING SHAFT
12 Claims, 7 Drawing Figs.

[52] U.S. Cl. ............................................. 277/136
[51] Int. Cl. ............................................. F16j 15/16
[50] Field of Search.................................. 195/198, 136, 139, 137

[56] References Cited
UNITED STATES PATENTS

| 794,539 | 7/1905 | O'Brien | 277/136 X |
| 1,076,457 | 10/1913 | Schultheiss | 277/136 X |
| 2,465,415 | 3/1949 | Aragones | 277/136 |
| 3,211,462 | 10/1965 | Durham et al. | 277/136 X |

Primary Examiner—Robert I. Smith
Attorney—McNenny, Farrington, Pearne and Gordon ABSTRACT: There is provided an improved shaft seal especially adapted for use on a rotating shaft, and characterized by a seal ring, a channel-form circular seal member disposed between the channel-form retainer and the seal ring, and locking means coacting between the seal ring and the channel-form seal retainer.

In a specific embodiment, the seal ring is provided with a key member or plurality thereof, and the seal retainer is provided with keyways which coact in assembly to prevent relative rotation of the seal ring with respect to the seal retainer. In addition, the seal ring is structured at its outer radial extremities to closely abut the channel-form seal retainer so as to provide an antitipping configuration.

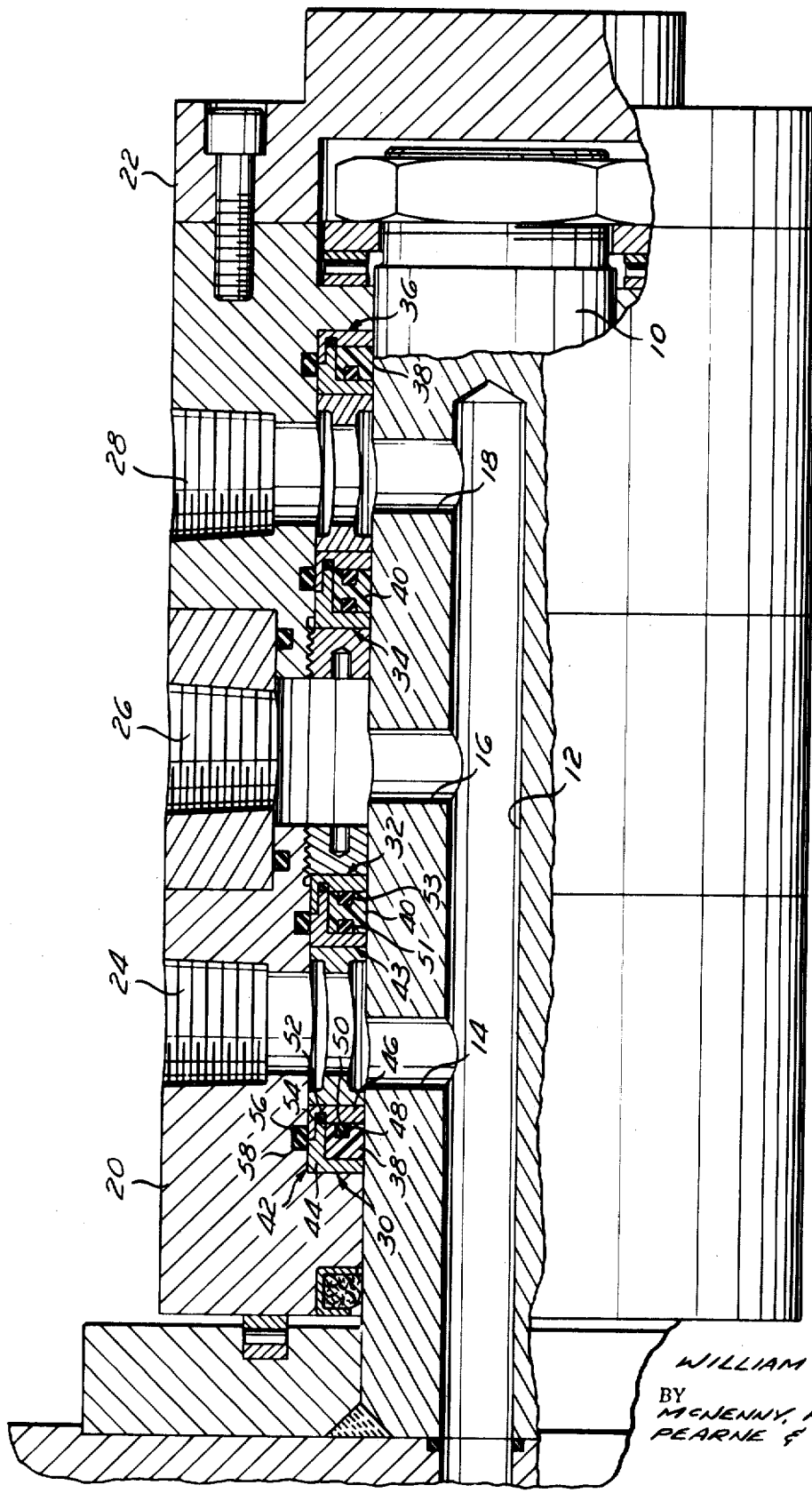

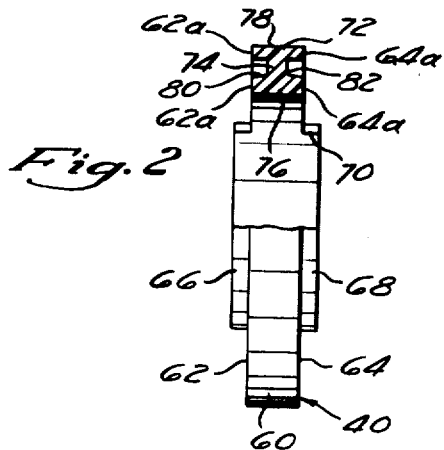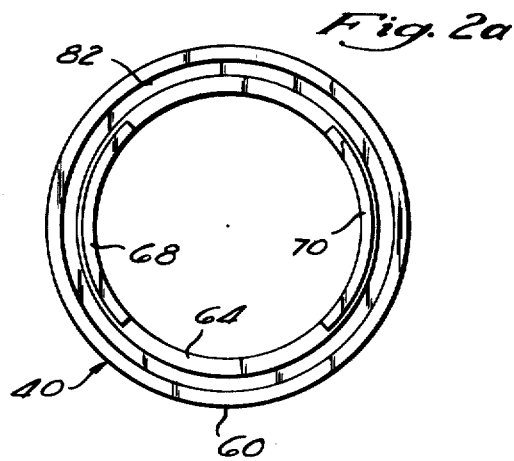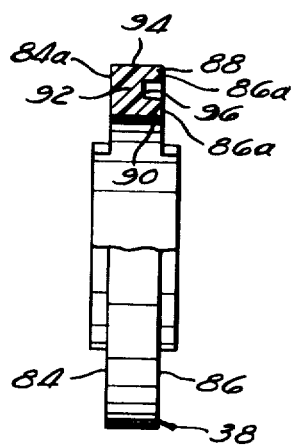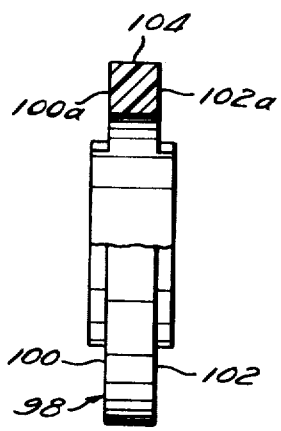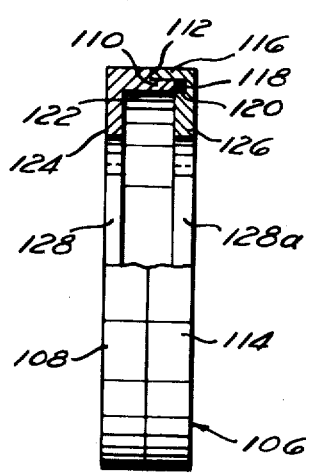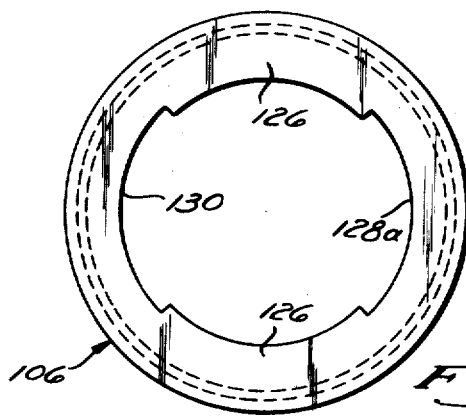

3,599,994

SHAFT SEAL FOR ROTATING SHAFT

BACKGROUND OF THE INVENTION

This invention relates, as indicated, to a shaft seal for a rotating shaft.

While the shaft seals of the present invention have utility in a number of applications, they have particular utility in installations where a rotating cylindrical member is provided within a cylinder, such as in a fluid distributor for control of hydraulically actuated piston-cylinder assemblies. In such an environment, the speed of rotation of the shaft and the pressure of the fluid in the system is such that commonly used sealing members, e.g., leather, cannot be used without rapid deterioration and failure. To overcome this problem, a low coefficient of friction material, such as Teflon or Teflon compositions, has been used. However, with relatively large diameter shafts required, for example, where large volumes of liquid are to be distributed through a number of ports by rotation of a cylindrical fluid distributor member, there is a tendency for the shaft seal ring to rotate with the cylindrical member or shaft. This causes the parts to wear rapidly.

In the past, an additional cause of excessive seal ring wear has been the tipping of the shaft seal ring under adverse operating conditions, such as extremely high pressures and/or high rates of shaft rotation. When the seal ring is tipped, only a portion of the inside peripheral surface of the seal ring will be contacting the adjacent rotating shaft. The angular relationship between the rotating shaft and a reduced portion of the inside peripheral surface of the seal ring will result in unduly rapid wear from one side and ultimate failure of the seal.

The present invention overcomes this difficulty by providing a structure in which the shaft seal ring is keyed to the channel-form circular seal retainer. The circular seal retainer may be conveniently clamped within a suitable recess in the cylinder, and thus relative rotation of the seal ring with respect to the seal retainer is prevented and relative rotation between the shaft and the seal ring is insured. These structures enable utilization of fluids under pressure, including not only hydraulic fluids of known composition, but also materials such as water, kerosene and air.

The present invention also eliminates the tipping of the seal ring, and consequently the corresponding excessive wear occurring if the seal ring is allowed to tip during operation. The seal ring is provided with an antitipping structure characterized by radial and outer peripheral surfaces which abut the corresponding interior surfaces of the circular seal retainer. The abutting surfaces are appropriately arranged so as to resist the lateral tipping pressures exerted by external fluids.

BRIEF STATEMENT OF THE INVENTION

Briefly stated, the present invention is in a shaft seal for a rotating shaft which comprises in combination a seal ring which includes at least one axially projecting key member. There is also provided a circular seal retainer which has a channel-form configuration in cross section and includes a peripheral ring portion and radially inwardly extending flanges projecting from each of the marginal edges of the peripheral ring portion. In combination with the seal ring, there is formed an internal annular recess in which there is positioned a resilient circular seal member, for example, an O-ring. Means are provided in at least one of the flanges for locking coaction with a key member of the seal ring. In addition, the seal ring includes radial and outer peripheral surfaces which closely abut the interior surfaces of the circular seal retainer. In such a seal, relative rotation between the seal ring and the seal retainer is prevented by the locking means and the seal ring is prevented from tipping by the abutting surfaces.

BRIEF DESCRIPTION OF THE DRAWINGS

FIG. 1 shows in partial cross section a rotating fluid distributor assembly, including a ported rotatable cylindrical member, and a stationary cylindrical body or housing, including fluid passages extending radially therethrough, and a plurality of seals in accordance with the present invention coacting between the housing and the rotatable cylindrical member.

FIG. 2 shows a partial cross section end view of a seal ring in accordance with the present invention.

FIG. 2a shows a side view of the seal ring shown in FIG. 2.

FIG. 3 shows a partial cross section end view and side view of a modification of the seal ring in accordance with the present invention.

FIG. 4 shows a partial cross section end view and side view of an additional modification of the seal ring in accordance with the present invention.

FIG. 5 is a plan view of a circular seal retainer in accordance with the present invention.

FIG. 6 is a side view in partial cross section of the circular seal retainer shown in FIG. 5.

DETAILED DESCRIPTION OF THE DRAWINGS

Referring now more particularly to FIG. 1, there is there shown a typical three-passage liquid distributor incorporating four sealing elements embodying the present invention. There is thus provided a rotatable cylindrical member 10, including an axially extending bore 12 having radial ports 14, 16, and 18 in fluid communication with the bore 12. The cylindrical member 10 is contained within a housing 20 having a cylinder head 22 and fluid ports 24, 26, and 28 extending through the sidewall thereof and spaced for registry with the fluid distributor ports 14, 16, and 18. Driving means (not shown) effect rotation of the cylindrical member 10 within the housing 20 to control fluid flow through the fluid ports 24, 26, and 28 in a predetermined manner which is known. In order to effect a suitable seal between the housing 20 and the cylindrical member 10, there are provided four sealing elements, 30, 32, 34, and 36, which confine pressurized fluid within predetermined axial limits, prevent escape of fluid under pressure from the housing-cylinder assembly, and permit relative rotation of the cylinder 10 with respect to the housing 20.

It may be noted that in the illustrated embodiment, the interior sealing elements 32 and 34, which are subject to pressure from both sides, utilize seal rings 40 having a configuration illustrated in FIG. 2. The exterior or outboard sealing elements 30 and 36, which are subject to pressure from only one side, utilize seal rings 38 having a configuration illustrated in FIG. 3. The seal rings 38 and 40 may be conveniently formed from Teflon poly[tetrafluoroethylene].

Referring to the sealing element 30 illustrated in FIG 1, a generally U-shaped, channel-form circular seal container 42 is conveniently formed of a male portion 44 and a female portion 46. In combination with the seal ring 38, the seal retainer member 42 defines an internal recess 48 in which there is disposed a resilient sealing ring 50, e.g., an O-ring or a "quad" ring. The female recess of the female portion 46 of the circular seal container 42 has a greater axial depth than the axial length of the extending male portion 44, so that a recess 52 is provided. In the recess 52 there is disposed a second resilient circular seal 54, for example, an O-ring Also, there is provided in the housing 20 an annular recess 56 adapted to receive and retain another resilient circular sealing member 58, for example, an O-ring. Sealing rings 50, 54, and 58 are static sealing members. The details of the sealing elements 30, 32, 34, and 36 are essentially the same except for the particular seal ring employed, and are best shown in FIGS. 2 through 6, inclusive.

FIGS. 2 and 2a, respectively, illustrate a partial cross section end view and a side view of a seal ring member 40 which is particularly useful in an inboard or interior sealing element. The seal ring structure includes a ring portion 60 dimensioned for sliding sealing relation with a rotatable shaft. The sealing ring 40 is provided with at least one key member. In the embodiment shown in FIG. 2, the respective planar surfaces 62 and 64 of the seal ring 40 are each provided with laterally projecting or axially projecting key members, such as key members 66 and 68. In FIG. 2a, a side view of the planar surface 64 illustrates two axially projecting key members 68 and 70. Thus, the seal ring illustrated in FIGS. 2 and 2a is provided with four laterally extending key members, wherein two key members extend from each side or planar surface of the seal ring. As best shown in FIG. 2a, the keys 68 and 70 are arcuate in configuration having an internal diameter which is equal to the internal diameter of the ring 60, subtend arcs of 90° each, and are oppositely disposed.

The key member portion of the seal ring as described above is identical in each of the seal rings disclosed in FIGS. 3 and 4.

The novel antitipping structures of the seal rings disclosed in this invention are illustrated in the partial cross section portions of FIGS. 2, 3, and 4. The seal ring illustrated in FIG. 2 is particularly suitable for use in inboard or interior sealing situations where high pressures are exerted from both sides upon the sealing ring. The sealing ring illustrated in FIG. 3 is particularly useful for exterior or outboard sealing elements, wherein high pressure is exerted only from one side upon the sealing ring.

As illustrated in FIG. 2, the outer peripheral extremities of the seal ring have an I-configuration in cross section. The I-configuration is composed of a top crossmember 72, a radial center member 74, and a lower crossmember 76. The side planar surfaces 62a and 64a and the outer peripheral surface 78 of the seal ring closely abut the interior surfaces of the circular seal retainer 43, as best shown in FIG. 1. These closely abutting surfaces located at the outer radial extremities of the seal ring provide a stable structure which eliminates tipping under extremely high pressures and/or high rotating speeds. The interior surfaces of the crossmembers of the I-configuration 72 and 76, the radial center member of the I-configuration 74, and the interior surfaces of the circular retaining seal 43 define two circular recesses 80 and 82. In the circular channels 80 and 82 there are disposed two resilient circular seals 51 and 53, for example, O-rings.

FIG. 3 illustrates the seal ring 38, which is particularly useful when pressure is only exerted from one side of the ring. As illustrated in the cross section portion of FIG. 3, the antitipping structure which is suitable in such a situation is comprised essentially of one-half the I-configuration shown in FIG. 2. The split I-configuration has a circular channel 96 defined by an upper crossmember 88, a lower crossmember 90, and a center radial member 92. The seal ring 38 provides side planar surfaces 84 and 86 extending to portions 84a and 86a, respectively, which abut the adjacent interior portions of the seal retainer 42, as set forth in detail below. The side planar surface portions 84a and 86a and the outer peripheral surface 94 of the seal ring 38 closely abut the interior surfaces of the circular seal retainer 42, as illustrated in FIG. 1. This closely abutting configuration eliminates tipping in a fashion similar to that discussed above with reference to seal 40. The interior surfaces of the crossmembers 88 and 90 and the interior surface of the radial member 92 coact with the interior surfaces of the seal 42 so as to define a circular recess 48. As shown in FIG. 1 in the recess 48, there is disposed a resilient circular seal 50, for example, an O-ring.

FIG. 4 illustrates a seal ring 98 which is particularly useful when high pressures are not involved. In this embodiment of the present invention, the side planar surfaces 100 and 102 provide portions 100a and 102a, respectively, which abut the interior surfaces of a circular seal-retaining member, such as 42 or 43. The outside diameter of the seal 98 is less than the inside diameter of the circular seal-retaining member, such as 42 or 43. Therefore, the outer peripheral surface 104 of the seal member 98 does not abut the interior surface of its corresponding seal retainer member. Thus, a circular channel is defined by the outer peripheral surface 104 of the seal 70 member 98, and the interior surfaces of its corresponding seal-retaining member. In this channel there is provided a resilient circular seal, for example, an O-ring.

Referring more particularly to FIGS. 5 and 6, there is here shown a circular seal retainer 106 which is identical in structure to the retainers 42 and 43 previously discussed. The seal retainer 106 is in two parts for ease in assembly, particularly where the seal ring possesses insufficient resilience for easy insertion into the seal retainer member.

FIG. 6 shows, for example, a male member 108 in cross section having a projecting flange portion 110 and a shoulder 112 for mating coaction with correspondingly configured parts on female retainer portion 114. Thus, the female retainer portion is provided with a rim portion 116 and a recess 118 having a greater axial depth than the axial length of the corresponding projecting flange 110. In the final assembly of the seal retainer member, there is desirably utilized a resilient seal ring 120 for sealing coaction between the recess 118 and the projecting flange portion 110. The mated configuration of the rim 116 and the projecting portion 110 defines a peripheral ring portion 122. The retainer is completed with radially inwardly projecting flanges 124 and 126 extending from and integral with the marginal edges of the peripheral ring portion 122.

As best shown in FIG. 5, there are provided locking keyways 128 and 130 dimensioned and positioned for locking coaction with the key members on a seal ring, for example, the key members 68 and 70 of the seal ring 40. The keyways 128 and 130 are arcuate recesses milled into the flanges 124 and 126 and subtending arcs of the same dimensions as the key members, for example, 90° as subtended by key members 68 and 70 in FIG. 2a. The recesses or keyways 128 and 130 are oppositely disposed as shown in FIG. 5, and each of the flanges 124 and 126 is provided with suitable keyways, such as keyways 128 and 128a in FIG. 6.

The seal ring, as indicated above, can be formed of a resilient or plasticized Teflon, or nylon, or, more preferably, a "filled" Teflon containing a substantial percentage, for example, 16 percent by weight of finely divided silica. The filled Teflon may also desirably contain from 1 to 5 percent by weight of molybdenum disulfide. Such filled materials are relatively rigid and cannot readily be inserted into a unitary circular seal retainer. Thus, for these and other relatively rigid seal ring members, the split ring seal retainer is the practical and desired embodiment. Instead of plastic materials which desirably have low coefficients of friction, the seal ring may be formed of carbon or pressed powdered metal, e.g., bronze. The pressed powdered metal seal rings may be oil filled if desired. Teflon may also be impregnated with powdered bronze, or in a reverse manner, the bronze-pressed powdered metal may have the pores thereof filled with a plastic material such as Teflon.

The shaft seals in accordance with the present invention are particularly useful where large diameter shafts are encountered and a relatively high surface feet-per-minute upon rotation of the cylindrical body, e.g., rotatable cylindrical member 10. For example, on a 1⅞-inch diameter shaft rotating at 550 r.p.m., the surface feet-per-minute rotation is 275. When under a pressure of 1,500 pounds per square inch; not uncommon in hydraulically actuated pistons and cylinders, any tendency of the seal ring to rotate with the rotatable cylindrical member, e.g., member 10 in FIG. 1, results in rapid wear and failure of the seal. The present devices are capable of withstanding the pressure velocity factors encountered in fluid distributors for hydraulically actuated equipment. These devices also enable the use of liquids not heretofore utilizable at these pressures and rates of rotation, namely, water and kerosene. Such very low lubricity fluids with prior devices cause or promote rotation of the shaft seal ring with the shaft and consequent wear.

What I claim is:

1. A shaft seal for a rotating shaft comprising in combination:
   a. a seal ring including at least one axially projecting key member;
   b. a channel-form circular seal retainer formed from a peripheral ring portion and flanges extending radially inwardly from each of the marginal edges of the peripheral ring portion, wherein at least one space is defined by the coacting circular seal retainer and the seal ring;

c. means in at least one of the flanges for locking coaction with the key member of the seal ring; and d. a resilient circular seal member disposed in the space defined by the circular seal retainer and the seal ring.

2. A shaft seal in accordance with claim 1, wherein the seal ring having two planar side surfaces includes at least one annular recess in at least one of the planar sides spaced from the outer periphery at its radial extremities.

3. A shaft seal in accordance with claim 2, wherein the seal ring has two oppositely disposed annular recesses.

4. A shaft seal in accordance with claim 1, wherein the inside diameter of the peripheral ring portion is greater than the outside diameter of the seal ring.

5. A shaft seal in accordance with claim 1, wherein the seal ring is formed from poly[tetrafluoroethylene].

6. A shaft seal in accordance with claim 5, wherein the poly[tetrafluoroethylene is filled.

7. A shaft seal in accordance with claim 6, wherein the poly[tetrafluoroethylene is filled with powdered silica.

8. A shaft seal in accordance with claim 5, wherein the poly[tetrafluoroethylene contains molybdenum disulfide dispersed therein.

9. A shaft seal in accordance with claim 1, in which the seal ring includes a plurality of axially projecting key members.

10. A shaft seal in accordance with claim 9, in which the key members have an arcuate configuration.

11. A shaft seal in accordance with claim 9, in which the key members extend bilaterally of the seal ring.

12. A shaft seal in accordance with claim 11, in which the seal ring is provided with a pair of uniformly circumferentially spaced key members of arcuate configuration on each side of the seal ring.